United States Patent
Luther

(10) Patent No.: US 12,248,061 B2
(45) Date of Patent: *Mar. 11, 2025

(54) OBJECT TRACKING USING COGNITIVE HETEROGENEOUS AD HOC MESH NETWORK

(71) Applicant: Quixotic Holdings, LLC, Lakeland, FL (US)

(72) Inventor: Ryan Scott Luther, Lakeland, FL (US)

(73) Assignee: QUIXOTIC HOLDINGS, LLC, Fife, WA (US)

( * ) Notice: Subject to any disclaimer, the term of this patent is extended or adjusted under 35 U.S.C. 154(b) by 194 days.

This patent is subject to a terminal disclaimer.

(21) Appl. No.: 17/898,199

(22) Filed: Aug. 29, 2022

(65) Prior Publication Data

US 2023/0069068 A1 Mar. 2, 2023

Related U.S. Application Data

(63) Continuation of application No. 17/027,532, filed on Sep. 21, 2020, now Pat. No. 11,428,800.

(51) Int. Cl.
*G01S 13/87* (2006.01)
*G01S 13/72* (2006.01)

(52) U.S. Cl.
CPC .......... *G01S 13/878* (2013.01); *G01S 13/726* (2013.01)

(58) Field of Classification Search
CPC ............................. G01S 13/726; G01S 13/878
See application file for complete search history.

(56) References Cited

U.S. PATENT DOCUMENTS

| | | | |
|---|---|---|---|
| 6,236,357 B1 | 5/2001 | Corwith | |
| 7,006,032 B2 | 2/2006 | King et al. | |
| 9,245,446 B2 | 1/2016 | Chen et al. | |
| 10,178,509 B1 * | 1/2019 | Perdew | H04W 4/027 |
| 10,419,103 B1 | 9/2019 | Perdew et al. | |

(Continued)

FOREIGN PATENT DOCUMENTS

CN 108737088 A 11/2018

OTHER PUBLICATIONS

Kotaru et al., "SpotFi: Decimeter Level Localization Using WiFi," ACM SIGCOMM Computer Communication Review—SIGCOMM'15 45(4):269-282, 2015.

*Primary Examiner* — Timothy X Pham
(74) *Attorney, Agent, or Firm* — Seed IP Law Group LLP

(57) ABSTRACT

Embodiments described herein are directed to tracking objects using a cognitive heterogeneous ad hoc mesh network. A first participant receives a notification signal from a second participant. The first participant determines first positioning information from the notification signal and second positioning information from characteristics of the received signal. If the difference between the first and second positioning information is below a first threshold, then the second participant is within line-of-sight of the first participant. If the difference is above the first threshold and below a second threshold, then the second participant may have a malfunctioning sensor. But if the difference is above the second threshold, then the second participant is not within line-of-sight of the first participant and the received signal was reflected off another object. The positioning information can then be refined or transmitted to other participants.

20 Claims, 10 Drawing Sheets

(56) References Cited

U.S. PATENT DOCUMENTS

| | | |
|---|---|---|
| 2005/0125134 A1 | 6/2005 | Iwatsuki et al. |
| 2005/0233748 A1 | 10/2005 | Robinson et al. |
| 2006/0082502 A1 | 4/2006 | Dooley |
| 2012/0109421 A1 | 5/2012 | Scarola |
| 2012/0264374 A1 | 10/2012 | Perkins et al. |
| 2012/0327840 A1 | 12/2012 | Chen et al. |
| 2015/0154554 A1 | 6/2015 | Skaaksrud |
| 2015/0338522 A1 | 11/2015 | Miller et al. |
| 2016/0105766 A1 | 4/2016 | de la Broise |
| 2016/0142876 A1 | 5/2016 | Klein |
| 2016/0198431 A1 | 7/2016 | Pattabiraman et al. |
| 2016/0258766 A1 | 9/2016 | Felemban et al. |
| 2018/0195874 A1* | 7/2018 | Andrew ............. G01C 21/3679 |
| 2019/0043369 A1 | 2/2019 | Miller et al. |
| 2019/0098457 A1 | 3/2019 | Perdew et al. |
| 2020/0027265 A1 | 1/2020 | Levy et al. |

\* cited by examiner

OBJECT TRACKING USING COGNITIVE HETEROGENEOUS AD HOC MESH NETWORK

BACKGROUND

Technical Field

The present disclosure relates generally to information distribution management and, more particularly, to utilizing aggregated information from multiple participant devices to create and improve communication and tracking of objects.

Description of the Related Art

Airplanes typically rely on radar or GPS information to track other airplanes. Some airplanes, however, may be flying in an area with poor or unreliable radar coverage. Similarly, some airplanes may not broadcast their current location to other airplanes. As a result, the radar and GPS information may not present a complete picture of all the airplanes in a given area, and thus create a dangerous situation in which airplanes may be flying near or towards one another without knowing.

At the same time, mobile communication devices, such as smart phones, have become a very integral part in many people's lives. The number of mobile communication devices in use, and people's reliance thereon, continues to grow. For example, many people have a need or expect to be able to connect to the Internet in a variety of different locations, including on commercial airlines. Many commercial airlines rely on satellite communication networks to provide their passengers with Internet access. However, these communication networks are often slow and have limited bandwidth capabilities. It is with respect to these and other considerations that the following disclosure addresses.

BRIEF SUMMARY

Briefly stated, embodiments described herein are directed to tracking objects using a cognitive heterogeneous ad hoc mesh network. A participant object can utilize received notification signals from other participants to determine if the other participant is within line-of-sight communication, out of line-of-sight communication, or has a malfunctioning sensor. A first participant receives a notification signal from a second participant. The first participant determines first positioning information that is included in the notification signal and second positioning information from characteristics of the received signal. If the difference between the first and second positioning information is below a first threshold, then the second participant is within line-of-sight of the first participant. If the difference is above the first threshold and below a second threshold, then the second participant may have a malfunctioning sensor. But if the difference is above the second threshold, then the second participant is not within line-of-sight of the first participant and the received signal was reflected off another object. The first participant can refine the positioning information and transmit it to other participants.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
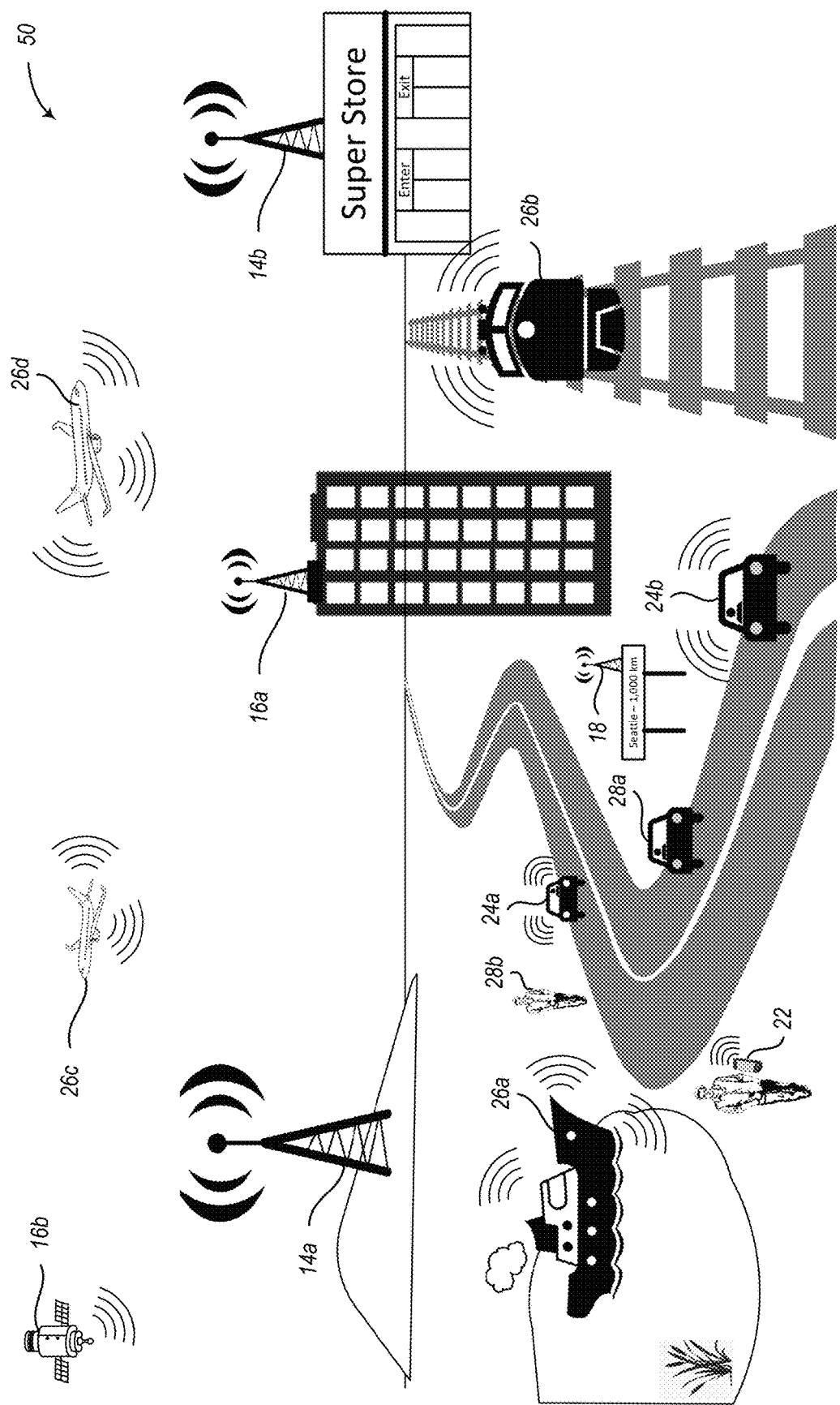
FIG. 1 illustrates a context diagram of an environment for utilizing a cognitive heterogeneous ad hoc mesh network to track participants and objects in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

As referred to herein, an "object" is a physical thing or item. Examples of objects include, but are not limited to, cars, planes, trains, boats, people, buildings, or other mobile or stationary things. Objects include participant objects and non-participant objects, which can be mobile or stationary. As referred to herein, a "participant" is an object that includes a computing device that can communicate specific, predetermined types of information and data to other participant objects via line-of-sight communications. And as referred to herein, a "non-participant" is an object that does not include a computing device that can communicate the same specific, predetermined types of information and data with a participant object. As discussed in more detail herein, participants can be mobile or stationary and may include computing devices of different sizes having different computing or networking capabilities. Throughout this disclosure, the term "participant" is used interchangeably with "participant object" and "participant computing device" and other related variations, and the term "non-participant" is used interchangeably with "non-participant object" and other related variations.

As referred to herein, "line-of-sight communication" refers to wireless transmission of information from a participant to another participant without other retransmission devices. Accordingly, line-of-sight is the maximum range one participant can communicate wirelessly with another participant without significant data loss. Examples of wireless transmissions used in line-of-sight communications include Bluetooth, Wi-Fi, ADSB, TCAS, or other protocols now known or developed in the future. In some embodiments, all communications between participants utilize a common protocol.

As referred to herein, "sensor" refers to a participant's utilization of line-of-sight communications to transmit information to another participant or to detect another participant or non-participant object. For example, the sensor may include a transmitter that transmits notification signals or other data via line-of-sight communications to another participant. Notification signals are radio signals that are broadcast or directionally transmitted from a participant to send information to other participants that are within line-of-sight of the transmitting participant. As one example, notification signals may include the participant's identification information, geolocation, kinematic information, throughput capabilities, frequency capabilities, and other information regarding the participant. The sensor can also transmit data signals to other participants. Data signals are radio signals that are broadcast or directionally transmitted from a participant to another participant or computing device to send or forward messages or data packets between participants and computing devices that are in line-of-sight communication with the transmitting participant. The sensor may also include a receiver that receives echo signals of the transmitted notification signals. These echoed notification signals can be utilized to determine a location of an object, which is described in more detail in U.S. patent application Ser. No. 15/892,259, filed Feb. 8, 2018 and issued as U.S. Pat. No. 10,178,509 on Jan. 8, 2019, which is herein incorporated by reference.

Sensors also include beam forming techniques and technologies that enable the sensor to transmit data to or detect objects in a specific sensor coverage area. This specific sensor coverage area is determined based on the beamwidth of the sensor transmissions and a threshold line-of-sight distance of such transmissions. The threshold line-of-sight distance may be determined based on the distance away from the transmission where data loss exceeds a predetermined threshold amount, which may be based on the type of transmitter utilized, power utilization, antenna capabilities, frequency, etc. Sensors may beam form in two dimensions away from a participant or in three dimensions away from the participant. In this way, sensors can be configured to transmit data or detect objects in a specific coverage area next to, in front of, behind, above, or below the participant, or a combination thereof.

FIG. 1 illustrates a context diagram of an environment 50 for utilizing a cognitive heterogeneous ad hoc mesh network to track participants and objects in accordance with embodiments described herein. Environment 50 includes a plurality of mobile participants (collectively referred to elsewhere herein as mobile participant computing devices 36), a plurality of stationary participants (collectively referred to elsewhere herein as stationary participant computing devices 34), and a plurality of non-participants (e.g., object 28a-28b). As mentioned above, the participants can communicate specific types of information or data with one another, but cannot communicate the same types of information with the non-participants.

Briefly, each mobile participant employs one or more sensors to communicate with other participants or to detect objects in the vicinity of the participant. A computing device, such as one or more of the mobile participants, a stationary participant, or a server computer or system may track participants and objects by utilizing echoes of self-transmitted notification signals or reflection signals of other participant notification signals. In this way, participants can track objects and transmit data and tracking information to other participants.

The following is a general discussion of the types of participants that may be utilized in such an environment and system. Embodiments, however, are not limited to these particular participants and combinations of participants. For example, in some embodiments, only tier 3 mobile participants (e.g., airplanes) may utilize the sensor coverage management described herein. In other embodiments, for example, a combination of mobile aerial participants and mobile ground participants may be utilized.

The plurality of mobile participants includes tier 1 mobile participants 22, tier 2 mobile participants 24, and tier 3 mobile participants 26. The three tiers of mobile participants are generally separated by the computing and networking capabilities of the computing devices associated with the mobile participant. The computing and networking capabilities may be limited or determined by the amount of power available or utilized by a mobile computing device, the amount of processing power available, or the size, type, or accuracy of the antenna utilized, etc.

For example, tier 1 mobile participants 22 typically have the smallest available power, lowest processing power, smallest bandwidth, shortest ranged antenna, lowest power output, lowest accuracy, and slowest update rate. Examples of tier 1 mobile participants 22 include, but are not limited to, mobile phones, laptop computers, tablet computers, wearable computing devices, or other smaller, low power, low transmission mobile computing or Internet-Of-Things devices. In the example illustrated in FIG. 1, there is only a single tier 1 mobile participant 22, which happens to be a mobile phone in this example. However, other numbers and types of tier 1 mobile participants 22 may also be employed.

Tier 2 mobile participants 24 typically have medium power constraints, a medium amount of processing power, medium bandwidth, medium range capabilities, medium accuracy, and medium update rate. Examples of tier 2 mobile participants 24 include, but are not limited to, automobiles, small personal boats, personal aircrafts, or other medium power, medium transmission, power regenerating mobile computing devices or objects that can support such mobile computing devices. FIG. 1 illustrates example tier 2 mobile participants 24 as including automobiles 24a and 24b. However, other numbers and types of tier 2 mobile participants 24 may also be employed.

Tier 3 mobile participants 26 typically have the largest available power, highest processing power, highest bandwidth, longest transmit and receive capabilities, highest accuracy, and fastest update rate among mobile participant computing devices. Example tier 3 mobile participants 26 include, but are not limited to, commercial airline planes, semi-trucks, cargo ships, trains, or other objects that can support larger, high power, high transmission mobile computing devices or objects that can support such mobile computing devices. FIG. 1 illustrates example tier 3 mobile participants 26 as including boat 26a, train 26b, and airplanes 26c and 26d. However, other numbers and types of tier 3 mobile participants 26 may also be employed.

Various embodiments described herein refer to mobile aerial participants or mobile ground participants. Mobile aerial participants and mobile ground participants are mobile participants. Thus, mobile aerial participants and mobile ground participants may likewise be separated into the three-tiers of participant capabilities.

For example, tier 1 mobile aerial participants may include personal computing devices that are onboard an airplane, such as user devices; tier 2 mobile aerial participants may include general aviation aircraft; and tier 3 mobile aerial participants may include cargo aircraft and commercial aircraft. Tier 1 mobile ground participants may include personal computing devices that are on a person walking down the street or on a car or in a boat; tier 2 mobile ground participants may include automobiles or recreational watercraft; and tier 3 mobile ground participants may include semi-trucks and cargo ships.

In some embodiments, one or more of these tiers may be further separated by capabilities or expected utilization. For example, tier 3 mobile aerial participants may include tier 3A mobile aerial participants that include cargo aircraft and tier 3B mobile aerial participants that include commercial aircraft. One situation where this distinction may occur is where a commercial aircraft is handling a lot of data requests from user devices onboard the aircraft (e.g., tier 1 mobile aerial participants), which may impact that aircraft's throughput for forwarding communications between other participants. Conversely, a cargo aircraft is typically not handling a lot of data requests from user devices onboard the aircraft, but is instead primarily being used to forward communications between other participants.

Although some embodiments may be described herein with respect to mobile aerial participants, embodiments are not so limited. Those same embodiments may instead utilize mobile ground participants or a combination of mobile ground participants and mobile aerial participants, unless the context clearly indicates otherwise.

The plurality of stationary participants includes ground entry points 14, remote entry points 16, and access nodes 18. In some embodiments, stationary participants may be referred to as ground participants. Similar to the three tiers of mobile participants, the ground entry points 14, remote entry points 16, and access nodes 18 are generally separated by computing and networking capabilities, and footprint size in some embodiments.

For example, ground entry points 14 typically have the largest available power, highest processing power, highest bandwidth, and longest range antenna capabilities. Example locations of ground entry points 14 include, but are not limited to, cellular towers, airports, large retail or superstores, or other locations that can support large sized, high power, high transmission stationary computing devices. FIG. 1A illustrates example ground entry points 14 as including tower antenna 14a and superstore 14b. However, other numbers and types of ground entry points 14 may also be employed.

Remote entry points 16 typically have medium power constraints, a medium amount of processing power, medium bandwidth, and medium range capabilities. Example locations of remote entry points 16 include, but are not limited to, restaurants and coffee shops, airfields and train stations, satellites, or other locations that can support medium sized, medium power, medium transmission stationary computing devices. FIG. 1A illustrates example remote entry points 16 as including store antenna 16a and satellite 16b. However, other numbers and types of remote entry points 16 may also be employed.

Access nodes 18 typically have the smallest available power, lowest processing power, lowest bandwidth, and shortest range antenna capabilities of the stationary participants. Example locations of access nodes 18 include, but are not limited to, road intersections, train crossings, road signs, mile markers, crosswalks, or other locations that can support smaller, low power, low transmission stationary computing devices. In the example illustrated in FIG. 1A, there is only a single access node 18, which happens to be a road sign in this example. However, other numbers and types of access nodes 18 may also be employed.

As mentioned herein, mobile and stationary participants can communicate with one another to pass information from one participant to another. Although in some embodiments, mobile participants may communicate with one another without the use of stationary participants.

Figure 2:
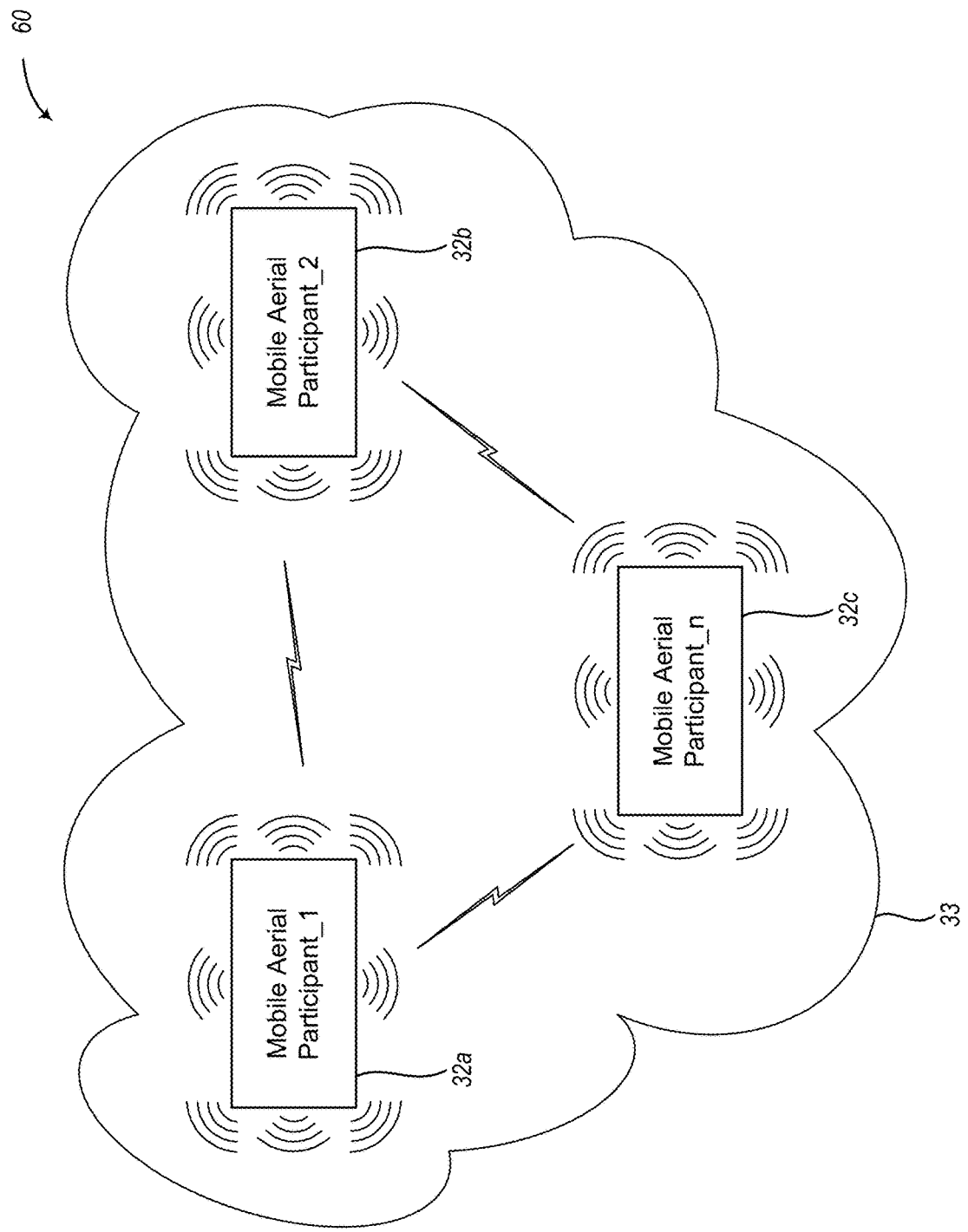
FIG. 2 illustrates a block diagram of a communication network between participants in accordance with embodiments described herein.

FIG. 2 illustrates a block diagram of a communication network between participants in accordance with embodiments described herein. FIG. 2 illustrates an example 60 of a communication network 33 between a plurality of mobile aerial participants 32a-32c. Collectively, the mobile aerial participants 32a-32c may be referred to as the network. Although FIG. 2 only illustrates three mobile aerial participants as creating network 33, embodiments are not so limited and one or a plurality of mobile aerial participants may be employed. Similarly, the network 33 may be established from other types of mobile participants, including various combinations of tier 1 mobile participants, tier 2 mobile participants, or tier 3 mobile participants, which perform many of the same functions as the mobile aerial participants.

Each mobile aerial participant 32a-32c transmits radio frequency signals to be received by other mobile aerial participants 32 that are within line-of-sight of the sending mobile aerial participant 32. These signals include, but are not limited to (1) data signals that transmit messages or data to another participant and (2) notification signals that provide personalized information regarding the sending mobile participant. In some embodiments, the notification signals are referred to as self-reporting messages or self-reporting signals. The notification signals can include one or both of notification signals for networking and routing among participants and notification signals for safety and de-confliction of possible threats.

The notification signals serve three primary simultaneous purposes: (1) to notify other participants of the sending participant's identity, position, and kinematic information; (2) to detect and track non-participant objects; and (3) to establish routing and network efficiencies (i.e., to create the participant table identifying where each participant is and with who they are in line-of-sight communication). In various embodiments, the notification signals provide individualized information regarding the sending mobile aerial participant 32 so that other mobile aerial participants 32 know that they are within line-of-sight communication of the sending mobile aerial participant 32 within network 33. These notification signals may be referred to as self-reporting signals, since the mobile aerial participant 32 is independently reporting its position and kinematic information to any other mobile aerial participants 32 that are within line-of-sight of the transmitting mobile aerial participant 32 without being prompted or requested by another mobile (or stationary) participant. The mobile aerial participants 32 utilize the notification signals to generate a participant table that is utilized to transmit data signals between the mobile aerial participants 32.

In various embodiments, the information in the notification signal includes the mobile aerial participant's 32 identification information, geolocation, kinematic information, attitude information, throughput capabilities, frequency capabilities, number and capability of sensors, and other information. In various embodiments, the notification signals also include transmission time information that allows for Time Distance of Arrival (TDOA) and Time of Flight (TOF) or Round Trip Timing (RTT) calculations.

The geolocation of the mobile aerial participant 32 may be determined via traditional methods like GPS sensors or modules, cell tower or stationary participant signal triangulation, or via notification messages from other devices or participants that know or estimate the position or location of the mobile aerial participant 32. This can be accomplished with extreme accuracy and minimal latency when notification messages are echoed and supported by stationary participants. The geolocation may also be referred to as the position or location of the mobile aerial participant 32.

The kinematic information may be obtained by monitoring the mobile aerial participant's 32 position and identifying changes over time, utilizing various sensors to calculate or determine the kinematic information, or obtaining it from another system.

The attitude information may be obtained from the electronics or flight controls or sensors of the mobile aerial participant 32. The attitude information may include yaw, pitch, roll, and sensitivity parameters of each.

The frequency capabilities of the mobile aerial participant 32 may be predetermined based on the type of hardware utilized by the mobile aerial participant 32. For example, the hardware of the mobile aerial participant 32 may be designed to utilize ACARS, IEEE 802.11 standards, or some other wireless transmission frequencies or standards, which defines the frequency capabilities of the mobile aerial participant 32. In other embodiments, the frequency capabilities may be predetermined based on government regulations regarding available frequencies. In yet other embodiments, the frequency capabilities may be defined by a user or administrator.

The throughput may be predetermined based on the type of hardware utilized by the mobile aerial participant 32 or on the current processing capacity or network traffic of the mobile aerial participant 32 or a number of other factors. For example, if the mobile aerial participant 32 is a Boeing 737-700 then it may have more throughput capabilities than a Boeing 777-200ER because the Boeing 737-700 may have less passengers and thus may be supporting fewer data requests from user devices onboard the airplane, which can allow for more possessing power to be directed towards forwarding communications between other participants.

The number and capability of sensors may identify the type of sensors, where their particular antennas are attached to the participant, the range/transmission capabilities of the sensors, their beamwidth characteristics, power levels, or other information regarding the sensors on the corresponding participant.

Notification signals are transmitted via directional broadcast beams. In various embodiments, directional notification signals may be transmitted in a sequential or non-sequential 360-degree pattern, so that the notification signal is transmitting in all directions surrounding the participant. In some embodiments, where there is little to no sensor overlap, the notification signals may be transmitted using directional or non-directional broadcast signals. In general, the use of the term "broadcast" herein refers to the transmission of a signal by a sending participant without being requested by another participant and does not have a specific participant as a destination.

Use of directional transmissions can reduce the amount of power needed to transmit the notification signal or other communication to another participant, while also providing additional versatility in providing additional sensor coverage by at least one sensor on at least one participant in an area. Moreover, the use of directional transmissions enables the sending participant to use just enough power to ensure it gets to its intended target. Additionally, directional transmissions can reduce interference between transmissions in a congested space as well as make transmissions more secure.

The notification signal may be broadcast periodically, at predetermined times, dynamically selected based on number and proximity of other mobile aerial participants, or at a given dynamically changing update rate. In some embodiments, the rate at which the mobile aerial participant 32 transmits its notification signal may change based on a combination of the distance, closure velocity, and closing angles between the sending mobile aerial participant 32 and other mobile aerial participants 32 within line-of-sight of the sending mobile aerial participant 32.

The mobile aerial participants 32a-32c transmit notification signals to inform other mobile aerial participants 32 of their position and movement. For example, mobile aerial participant 32a transmits notification signals with information identifying itself and its respective geolocation and kinematic information without regard to the presence or location of mobile aerial participants 32b or 32c. If mobile aerial participant 32c is within line-of-sight of mobile aerial participant 32a, mobile aerial participant 32c receives the transmitted notification signals from mobile aerial participant 32a and utilizes the information in the notification signals, and its own location and kinematic information, to identify the position and movement of mobile aerial participant 32a relative to itself.

The mobile aerial participants 32 can utilize the notification signals to track other participants and non-participants (e.g., by using echo signals of the notification signals to locate objects) and to create and update the participant table to identify which participants are in network 33, their location, their capabilities, and who they are in line-of-sight communication. The various communications between the mobile aerial participants 32a-32c create a communication network 33 among each other that enables them to communicate with one another without the use of another communication backbone, such as a cellular tower network.

The data signals transmitted by one participant to another participant may be transmitted via directional transmission beams or non-directional transmission signals. In various embodiments, the sending mobile aerial participant 32 utilizes a participant table to determine a location of the recipient participant. The sending mobile aerial participant 32 can directionally focus the transmitted data signals towards the recipient participant based on the position of the sending participant and the position of the recipient participant. The use of directional transmissions can reduce power consumption and increase the range in which transmission can be received, while also reducing interference between transmissions in a congested space.

The data signals may be the fusion or combination of payload data and a self-reporting message (similar to the information provided in a notification signal). The size of each data signal may be variable and may dynamically change based on current network bandwidth, individual participant bandwidth, requests for more or less information, requests for higher or lower fidelity tracking of participants or objects, etc. In some embodiments, the amount of payload data may be increased or decreased to accommodate changes in the size of the data signals. In other embodiments, the amount of information in the self-reporting message portion may be increased or decreased to accommodate changes in the size of the data signals. In yet other embodiments, different combinations of increases or decreases to the payload data or the self-reporting message portion may be utilized. In various embodiments, other characteristics of the data signals may be dynamically modified, including changing the pulse width of the transmission beam, changing the energy on the destination participant, etc.

The data signals (or the notification signals) may be packetized for security and ease of transmission (e.g., VOIP or other packetized data-driven services). The data or a portion of the data of each packet may be utilized as a thumbprint of each individual packet. For example, in some embodiments, each packet may include one or more beam characteristics used to transmit the data signal. These beam characteristics can be compared for subsequent packets to determine if the packets originated from the same participant. Similar comparisons of subsequent packets can be performed on other data included in a notification signal (geolocation, kinematic information, attitude information, throughput capabilities, frequency capabilities, number and capability of sensors, etc.).

Although not illustrated, other mobile participants and stationary participants may also perform similar actions as described above to identify and track mobile participants that are in line-of-sight to support management of the participant table and to communicate data or information amongst themselves to increase accuracy and efficiency of each participant.

Figure 3A:
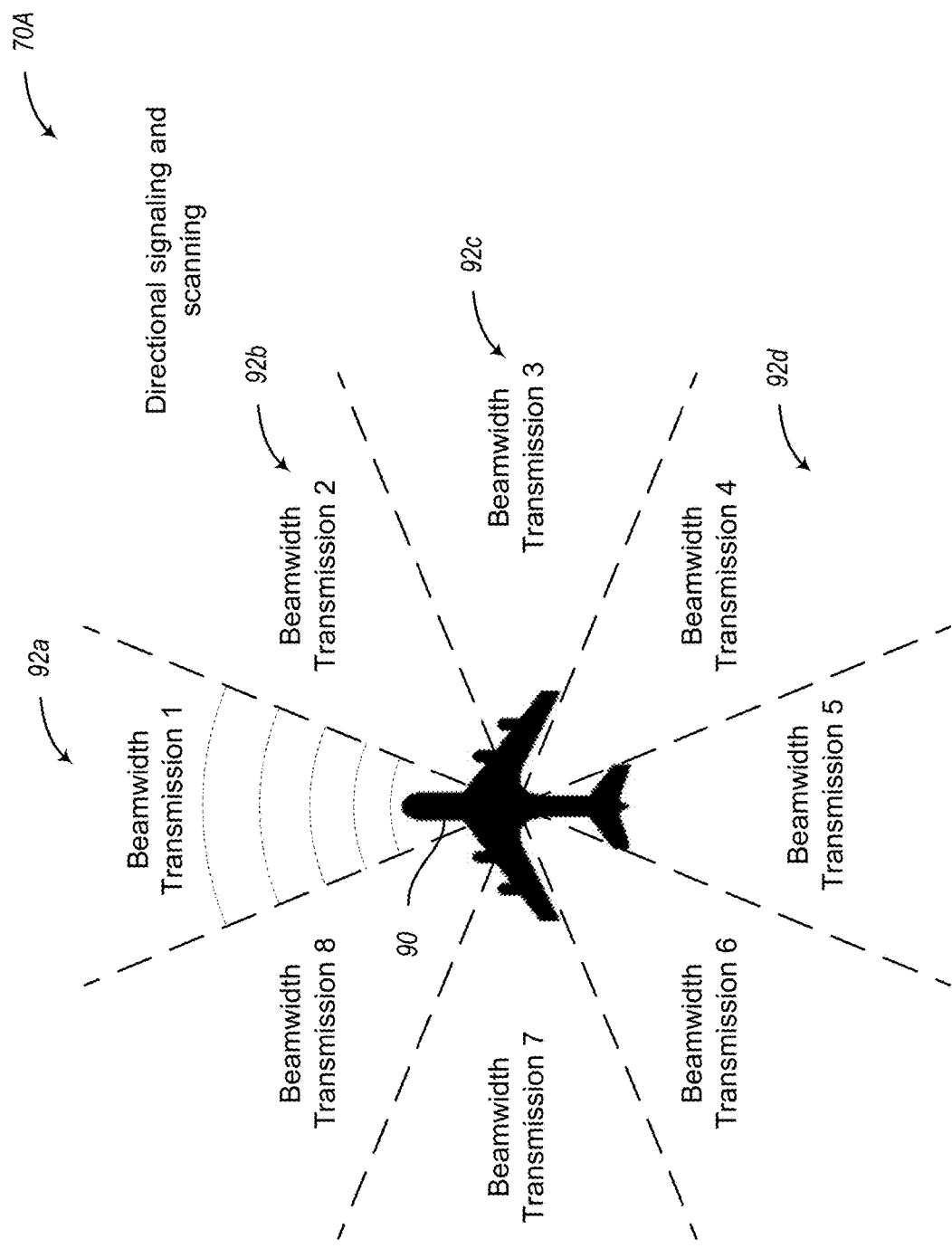
FIGS. 3A-3B illustrate context diagrams of using directional signaling and scanning to provide directional communication between participants in accordance with embodiments described herein.
Figure 3B:
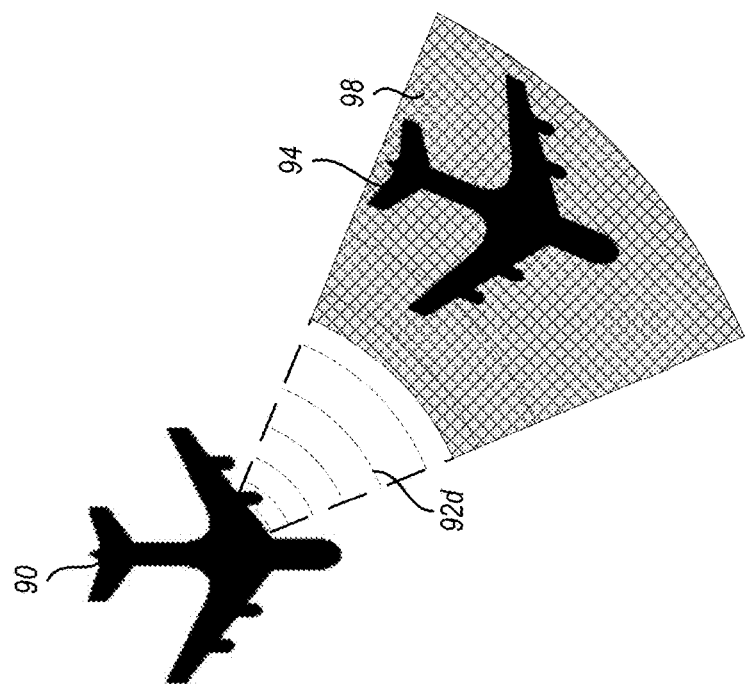

FIGS. 3A-3B illustrate context diagrams of using directional signaling and scanning to provide directional communication between participants in accordance with embodiments described herein. FIG. 3A illustrates an example 70A of first participant 90, such as an airplane, transmitting directional notification signals 92a-92d. As shown, each notification signal 92 is transmitted away from the first participant 90 at a particular angle with a particular beamwidth. In various embodiments, the first participant 90 waits a predetermined amount of time before transmitting the next notification signal 92 at the next angle. In other embodiments, the first participant 90 may continuously transmit the next notification signal at the next angle and utilize phased, frequency, and polarity shifts to allow for simultaneous transmission and reception of notification signals. The beamwidths of the notification signals 92 may not overlap, e.g., as illustrated in FIG. 3A, or they may partially overlap one another.

In the illustrated example in FIG. 3A, the first participant 90 transmits eight notification signals with 45 degree beamwidth to cover 360 degrees around the first participant 90. Although FIG. 3A illustrates the notification signals as two-dimensional transmissions, embodiments are not so limited, and the notification signals may be transmitted as three dimensional signals, such as a cone shape. In some embodiments, the first participant 90 may transmit a first set of notification signals at a first elevation, e.g., with a center of the transmission on a horizontal axis from the first participant, and a second set of notification signals at a second elevation, e.g., with a center of the transmission at a 30 degree angle towards the ground. The first participant 90 may continue with additional sets of notification signals as different vertical or elevational angles to create a three-dimensional coverage area.

In various embodiments, the first participant 90 transmits the notification signals 92 in a sequential order. For example, notification signal 92a is transmitted first, followed by notification signal 92b, which is followed by notification signal 92c, and so on. A complete transmission cycle occurs when all eight notification signals 92 have been transmitted. A complete transmission cycle is used to notify other participants within line-of-sight of the first participant 90 of the first participant's 90 location and kinematic information.

Although FIG. 3A illustrates eight notification signals being used for a complete transmission cycle, other numbers of notification signals at other beamwidths may also be utilized. Moreover, the first participant 90 may include one or a plurality of sensors that each performs such directional notification signals. In at least one such embodiment, each sensor may include a complete transmission cycle that is 360 degrees, 90 degrees, or some other total coverage area. Moreover, a complete transmission cycle may include one or more different planes or levels in a 3-dimensional area around the first participant 90. For example, a given sensor may have a 90 degree horizontal beamwidth area to cover, but also include a positive 45 degrees and negative 45 degrees vertically with respect to the horizon of the first participant 90—although other coverage areas may be employed.

In various embodiments, a complete transmission cycle is performed at a given update rate, which may be predetermined or may dynamically change. For example, in some embodiments, the update rate may be faster when there are more participants or non-participant objects near the first participant 90, compared to when there are few or no objects near the first participant 90. In other embodiments, the update rate may be faster when the first participant 90 is moving at a higher speed compared to when the first participant 90 is moving at a slower speed.

In some embodiments, the first participant 90 may also maintain individualized update rates for each participant that is in line-of-sight of the first participant 90. However, since the first participant 90 does not request the positional information from other participants, it can utilize only the received notification signals based on the update rate, while ignoring every other notification signal from the other participant. For example, if another participant is transmitting notification signals once every second, but the first participant 90 has an update rate of once every five seconds for the other participant, then it may utilize one of the five notification signals that it receives in a five second period while ignoring the rest. This individualized update rate may dynamically change based on the distance and velocity of closure between the first participant 90 and the other participant object. In this way, the first participant 90 utilizes more notification signals from the first participant 90 when the other participant and the first participant 90 are closer together or traveling towards each other such that there is a threat of potential collision, and ignores superfluous notification signals if they are far apart or traveling away from one another. In other embodiments, first participant 90 can use one of its self-reported notification signals to communicate to other participants within line of sight to increase its update rate, if needed.

FIG. 3B illustrates an example 70B of a second participant 94 coming within line-of-sight of the first participant 90 while the first participant 90 is transmitting directional notification signals 92.

As shown in FIG. 3B, the notification signal 92d is transmitted away from the first participant 90. The second participant 94 receives the notification signal 92d. Based on the information in the notification signal 92, the second participant 94 updates the participant table. Likewise, the second participant 94 is also transmitting notification signals, not illustrated, that are being received by the first participant 90.

When the first participant 90 has a message or communication to transmit to the second participant 94, the first participant 90 utilizes the participant table to determine the location and movement of the second participant 94 relative to the location and movement of the first participant 90. The first participant 90 can then directionally transmit a signal (e.g., a data signal), similar to the directional transmission of the notification signal 92d, to the second participant 94 with the message or communication. In general, notification signals are not directed towards a specific participant, but data transmission signals are directed towards a specific participant. In this way, the transmission power can be focused on a relatively narrow beamwidth rather than a non-directional broadcasted message, which improves power utilization and reduces the chance of interception by third parties.

Although not described in detail herein, the first participant 90 can receive an echo signal of the notification signal off the second participant 94 to determine a position of the second participant object 94. The first participant 90 can calculate the approximate distance the second participant 94 is away from the first participant 90 based on the time of flight from the transmission of the notification signal 92d to the receipt of the echo signal, and an approximate direction based on angle of arrival of the echo signal. This approximate distance and direction are used to determine an approximate position 98 of the second participant 94.

Utilization of the echo signal from the notification signal can be helpful in identifying and tracking non-participants. Similarly, such independent determination of the approximate position of the second participant 94 may be utilized if a participant's equipment is malfunctioning and not transmitting notification signals or if the information in its notification signals is not accurate. Thus, this approximated position calculation can be compared to the location information in the notification signals to confirm that the information in the notification signals is accurate.

Figure 4A:
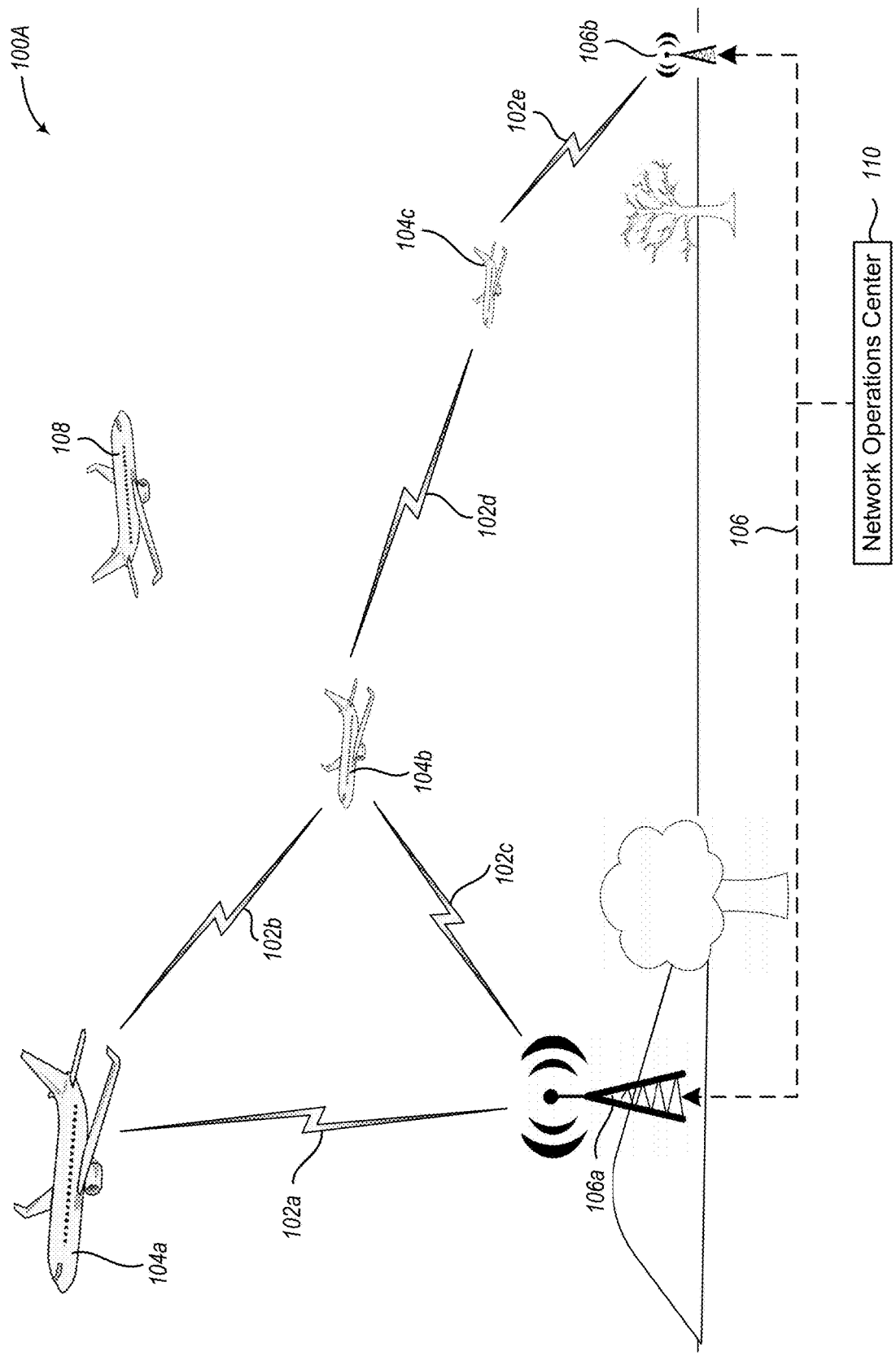
FIGS. 4A-4C illustrate context diagrams illustrating use-case examples of employing a cognitive heterogeneous ad hoc mesh network to track participants and objects in accordance with embodiments described herein.
Figure 4B:
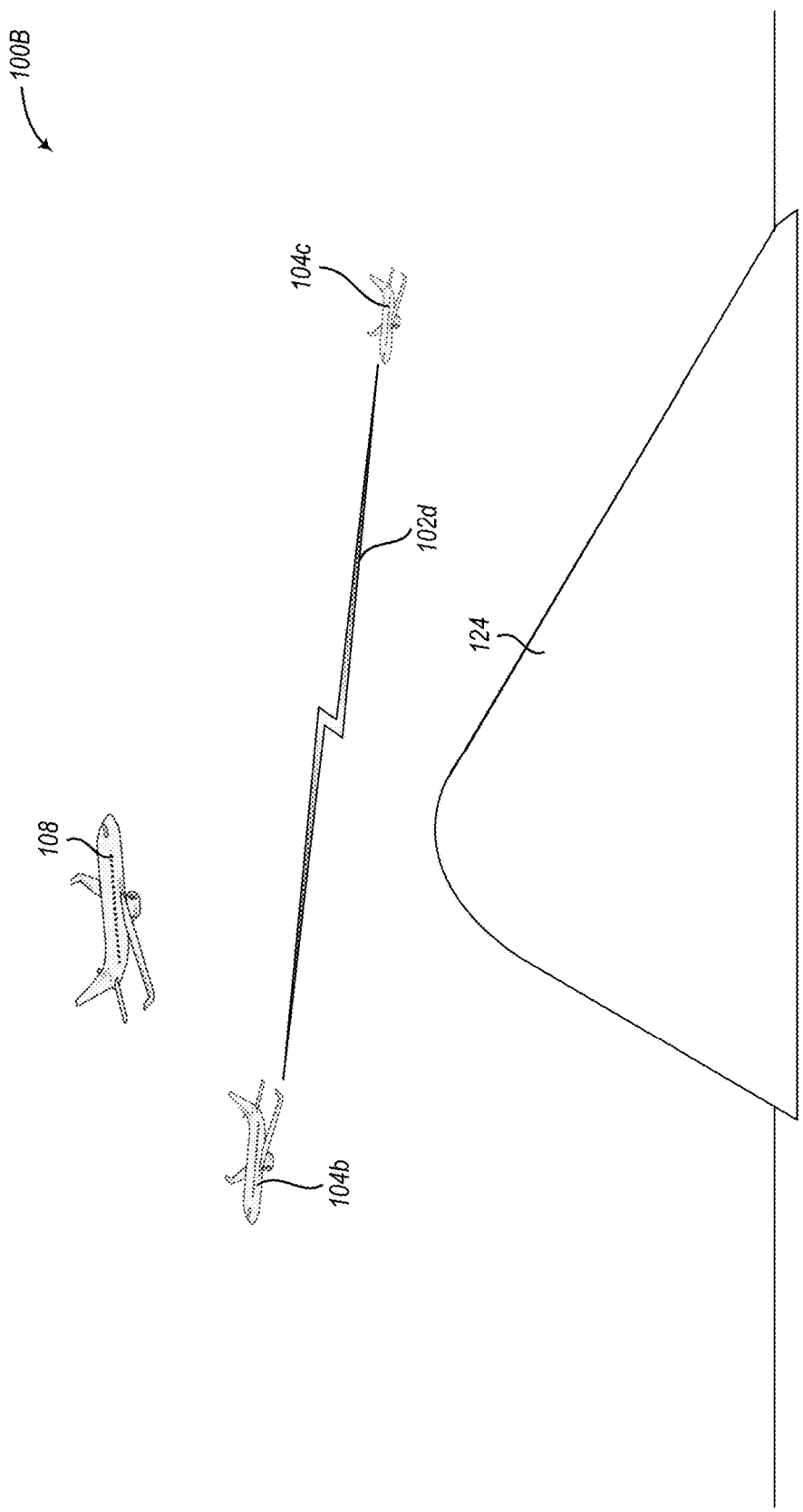
Figure 4C:
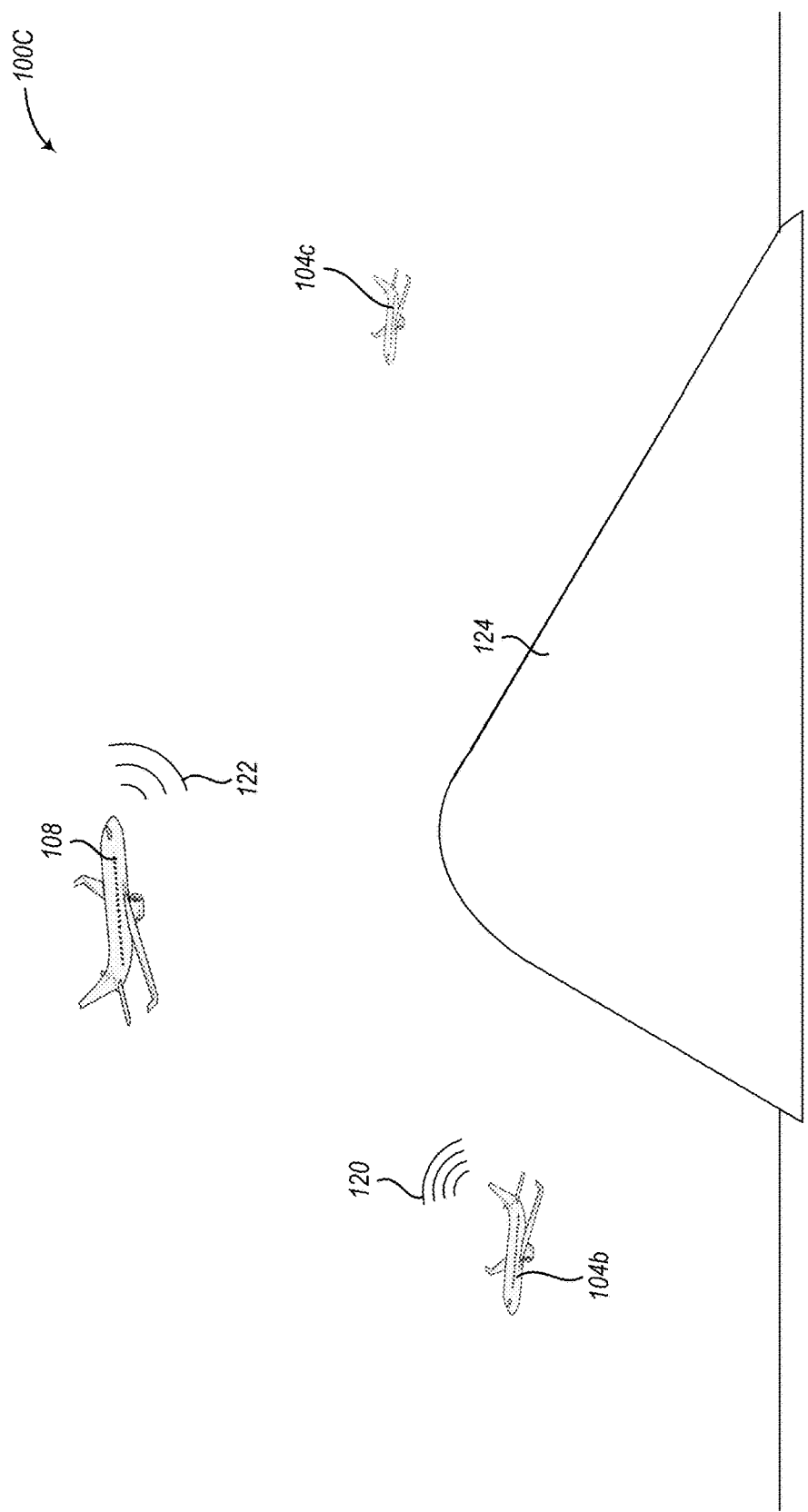

FIGS. 4A-4C illustrate context diagrams illustrating use-case examples of employing a cognitive heterogeneous ad hoc mesh network to track participants and objects in accordance with embodiments described herein.

Example 100A in FIG. 4A illustrates a plurality of mobile aerial participants 104a-104c. Each mobile aerial participant 104a-104c utilizes one or more sensors to transmit notification signals and data signals to other participants, such as mobile aerial participants 104a-104c, or to stationary participants 106a-106b, via line-of-sight communications 102a-102e. Similarly, each mobile aerial participant 104a-104c also tracks the position of the other mobile aerial participant 104a-104c and any non-participants 108.

In this illustration, assume mobile aerial participant 104a and tower 106a are within line-of-sight communication of each other via link 102a; mobile aerial participant 104a and mobile aerial participant 104b are within line-of-sight communication of each other via link 102b; mobile aerial participant 104b and tower 106a are within line-of-sight communication of each via link 102c; mobile aerial participant 104b and mobile aerial participant 104c are within line-of-sight communication of each other via link 102d; and mobile aerial participant 104c and tower 106b are within line-of-sight communication of each other via link 102e; and assume tower 106a and tower 106b communicate via wired connection or wired communication network, referred to as link 106. Each of these links may be referred to as a participant pair.

In various embodiments, each mobile aerial participant 104a-104c, one or more stationary participants 106a-106b, or a network operations center 110 (i.e., one or more server computing systems) maintains a network database or participant table with information about each participant and the participant pairs between participants. For example, the network database may store information for each participant, such as a unique identifier that has been registered within the network, specific type aircraft, nationality, owner, transmit/receive capabilities (e.g., spectrum, polarity, type and location of antennas or sensors), etc. The database or participant table may also identify one or more communication characteristics of each link 102a-102d, such as signal to noise ratio, quality of signal, spectrum capability, frequency capability, environmental conditions, and other characteristics. This information can be transmitted, along with kinematic or other data, in notification signals or other types of transmission signals (e.g., data signals), to paint a three-dimensional picture of the network. Mobile aerial participants 104a-104c utilize a locally stored version of the database or participant table to transmit data or data requests between participants. The participant tables can also be utilized to track the position and movement of non-participants. For example, the participant table (or other object-tracking table) may be shared between mobile aerial participants 104a-104c and stationary participants 106a-106b, and it may include a position, movement, estimated size or type, or other details about any non-participants 108 that are being identified and tracked by any of the participants.

Example 100B in FIG. 4B illustrates a specific example where mobile aerial participants 104b-104c are communicating with one another via communication link 102d. In this illustrated example, mobile aerial participant 104c and mobile aerial participant 104b have a direct line-of-sight to each other without interference from obstruction 124. Therefore, mobile aerial participants 104b-104c can transmit notification signals and data signals to one other without the signals being interrupted by obstruction 124. In this example, obstruction 124 is a mountain, but in other situations obstruction 124 may be a building or other objects that prevent, interfere, or interrupt direct line-of-sight communication between participants. As discussed herein, the mobile aerial participants 104b-104c may be informing each other of their current location or they may be providing tracking information regarding non-participant 108 so that the mobile aerial participants 104b-104c can refine or improve the tracking of non-participant 108 (including location and movement of non-participant 108).

Example 100C in FIG. 4C illustrates a specific example where mobile aerial participant 104b has traveled behind obstruction 124 and is no longer in direct line-of-sight communication with mobile aerial participant 104c. Mobile aerial participant 104b will continue to transmit notification signals 120 to track non-participant 108 and to notify any other participants (not shown) within line-of-sight communication of mobile aerial participant 104b of its location and movement.

In some situations, the notification signal 120 will reflect off non-participant 108, which is represented as reflection signal 122. Mobile aerial participant 104c receives the reflection signal 122 off non-participant 108. Because mobile aerial participant 104c utilizes directional antennas, mobile aerial participant 104c can determine an angle of arrival, power level, and receipt time of the reflection signal 122. Mobile aerial participant 104c utilizes this information to determine an approximate origination location of the reflection signal 122, which may be a particular geolocation or a location along a selected trajectory from the mobile aerial participant 104c. At this point, mobile aerial participant 104c may not know whether the reflection signal 122 is a reflection signal or a line-of-sight notification signal transmitted from non-participant 108, assuming the non-participant 108 is actually a participant that can transmit notification signals.

As described above, notification signal 120, and thus the reflection signal 122, includes the mobile aerial participant's 104b identification information, geolocation, kinematic information, and other information specific to that participant. This information is compared to the approximate origination location of the reflection signal 122. If a difference between the approximate origination location and the geolocation within the reflection signal 122 does not match and exceeds a selected threshold, then mobile aerial participant 104c knows that the reflection signal 122 did not originate from non-participant 108, but rather from mobile aerial participant 104b—even though mobile aerial participants 104b-104c lost line-of-sight communication with one another.

Mobile aerial participant 104c can utilize the information in the reflection signal 122 to track the location and movement of mobile aerial participant 104b. In some embodiments, mobile aerial participant 104c can attempt to communicate with mobile aerial participant 104b by directing data signals towards non-participant 108 (e.g., at a same trajectory as the angle of arrival of the reflection signal 122 or slightly modified based on movement of the mobile aerial participant 104c or movement of the non-participant 108). By a similar process, mobile aerial participant 104b can receive such data signals by receiving reflection signals off non-participant 108. The reflection signal 122 can also be utilized by mobile aerial participant 104c to refine the tracked location and movement of non-participant 108.

The operation of certain aspects will now be described with respect to FIGS. 5 and 6. In at least one of various embodiments, processes 200 and 250 described in conjunction with FIGS. 5 and 6, respectively, may be implemented by or executed on one or more computing devices, such as mobile participants 36, stationary participants 34, or network operation center server 40.

Figure 5:
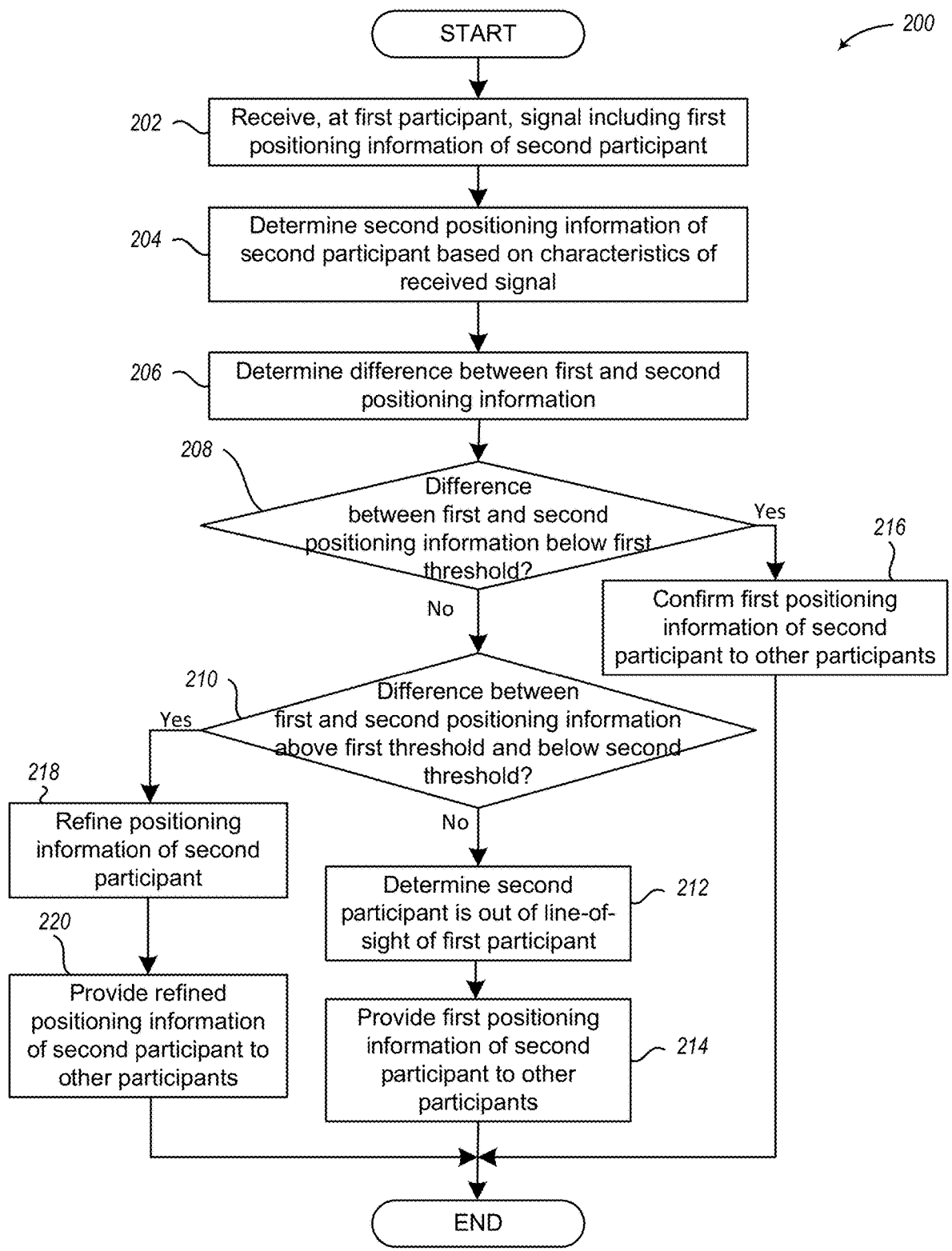
FIG. 5 illustrates a logical flow diagram showing one embodiment of a process for a computing system to utilize reflections of participant communication signals to track objects in accordance with embodiments described herein.

FIG. 5 illustrates a logical flow diagram showing one embodiment of a process for a computing system to utilize reflections of participant communication signals to track objects in accordance with embodiments described herein. Process 200 begins, after a start block, at block 202, where a first participant receives a communication signal that includes first positioning information of a second participant. The communication signal may be a line-of-sight notification signal from the second participant or a reflection of a notification signal from the second participant.

In various embodiments, the first positioning information may include the second participant's identification information, geolocation, or kinematic information, or some combination thereof. The first positioning information may also include throughput capabilities, frequency capabilities, sensor capabilities, beam characteristics, or other information regarding the second participant or the signal transmission.

Process 200 proceeds to block 204, where second positioning information of the second participant is determined based on characteristics of the received signal. The second positioning information may be an estimated position of the second participant. The characteristics of the received signal may include a direction of receipt of the signal (angle of arrival), a time-of-flight value for the signal (e.g., by subtracting a transmission timestamp associated with the signal from the time of receipt), power level or other types of information that can be used to detect a position of the source of the received signal. The angle of arrival, power level, and time-of-flight value may be utilized to determine an estimated origination location of the received signal, which may include a trajectory relative to the first participant and a distance. In some embodiments, movement of the second participant can be determined based on position changes determined from receipt of multiple signals.

Process 200 continues at block 206, where a difference between the first and second positioning information is determined. In some embodiments, this difference may be determined by one or more comparisons. For example, if the geolocation of the first positioning information indicates that the second participant is at Location_A and the second positioning information indicates that the second participant is at Location_B, the difference may be the horizontal distance in meters between the two locations. As another example, the difference may be a vertical difference in altitude between the first and second locations. In yet other embodiments, the difference may be a 3-dimensional difference that accounts for differences in horizontal distance, vertical distance, and trajectory relative to the first participant.

Process 200 proceeds next to decision block 208, where a determination is made whether the difference between the first and second positioning information is below a first threshold. In at least one embodiment, the first and second positioning information may be considered as matching when the difference between the first and second positioning information is below the first threshold. In some embodiments, a match occurs when the geolocation within the data of the received signal is identical to or within the first threshold from the estimated location determined from the received signal characteristics. A match between the first and second positioning information may indicate that the received signal was a line-of-sight communication from the second participant and not a reflected signal off another object. If the difference between the first and second positioning information is below the first threshold, then process 200 may flow to block 216; otherwise, process 200 may flow to decision block 210.

At block 216, the first positioning information of the second participant is confirmed or forwarded to other participants. In some embodiments, a local participant table maintained by the first participant is updated with the first positioning information of the second participant. The first participant can then forward this participant table to other participants so that they can update their locally maintained participant tables. After block 216, process 200 may terminate or otherwise return to a calling process to perform other actions.

If, at decision block 208, the difference between the first and second positioning information is not below the first threshold, then process 200 flows from decision block 208 to decision block 210. At decision block 210, a determination is made whether the difference between the first and second positioning information is above the first threshold and below a second threshold.

In some situations, the sensors on the second participant may be malfunctioning and providing incorrect information, such as an incorrect geolocation. The first participant may detect such a malfunction if the difference between the second participant's reported geolocation (e.g., from within the data of the received signal) and the estimated location determined from the received signal characteristics exceeds the first threshold, but is below the second threshold. Such a malfunction, however, may not be detectable if the difference exceeds the second threshold, because the received signal may have reflected off another object, which caused the difference to exceed the second threshold. If the difference between the first and second positioning information is above the first threshold and below the second threshold, then process 200 may flow to block 218; otherwise, process 200 may flow to block 212.

At block 218, the positioning information of the second participant is further refined. Because the difference between the second participant's reported geolocation and the estimated location determined from the received signal characteristics may indicate a malfunction of a sensor on the second participant, the first participant can further refine the positioning information of the second participant.

In some embodiments, the first participant can transmit notification signals and receive the echoed notification signals to determine a location of the second participant, as described herein. This location information can be utilized to further refine or modify positioning information of the second participant. In other embodiments, the first participant can send a request for updated information to other participants within line-of-sight of the second participant. These other participants can respond with information they have collected regarding the second participant, which the first participant can use to further refine the positioning information of the second participant. For example, the first participant can receive the position of the other participants, a distance from the other participants to the second participant, and heading or direction from the other participants to the second participant. With this information, the first participant can triangulate an estimated position of the second participant. In various embodiments, the first participant may continue to refine the positioning information of the second participant until some refinement criteria is satisfied, which is further described in FIG. 6.

Process 200 proceeds next to block 220, where the refined positioning information of the second participant is provided to other participants. In some embodiments, block 220 may employ embodiments of block 216, where the first participant updates its locally maintained participant table with the refined positioning information and transmits the updated participant table to the other participants. After block 220, process 200 may terminate or otherwise return to a calling process to perform other actions.

If, at decision block 210, the difference between the first and second positioning information is above the second threshold, then process 200 flows from decision block 210 to decision block 212. At block 212, the first participant determines that the second participant is not within line-of-sight of the first participant and that the received signal was reflected off another object. In various embodiments, this determination is made assuming the first participant did not receive another signal from the second participant that was similarly processed and determined to originate from the second participant, e.g., at blocks 208 and 210.

Process 200 continues next at block 214, where the first positioning information of the second participant is provided to other participants. Because it is determined that the first and second participants are not within line-of-sight of one another, other participants in proximity to the first participant may also be out of line-of-sight of the second participant. These other participants may benefit from having the second participant's positioning information for tracking or data transmission purposes, such as to determine if the second participant may become a threat to the other participant or if the other participant can use the second participant to forward data signals at some time in the future.

In various embodiments, the first participant may also identify and track the object that caused the reflection signal based on the second positioning information. In some embodiments, the first participant may further track the object using notification signals and echoes, and can continue to refine the positioning information of the object until some refinement criteria is satisfied, which is further described in FIG. 6

In some embodiments, block 214 may employ embodiments of block 216, where the first participant updates its locally maintained participant table with the first positioning information of the second participant (or the tracked object) and transmits the updated participant table to the other participants.

After block 214, process 200 may terminate or otherwise return to a calling process to perform other actions.

Figure 6:
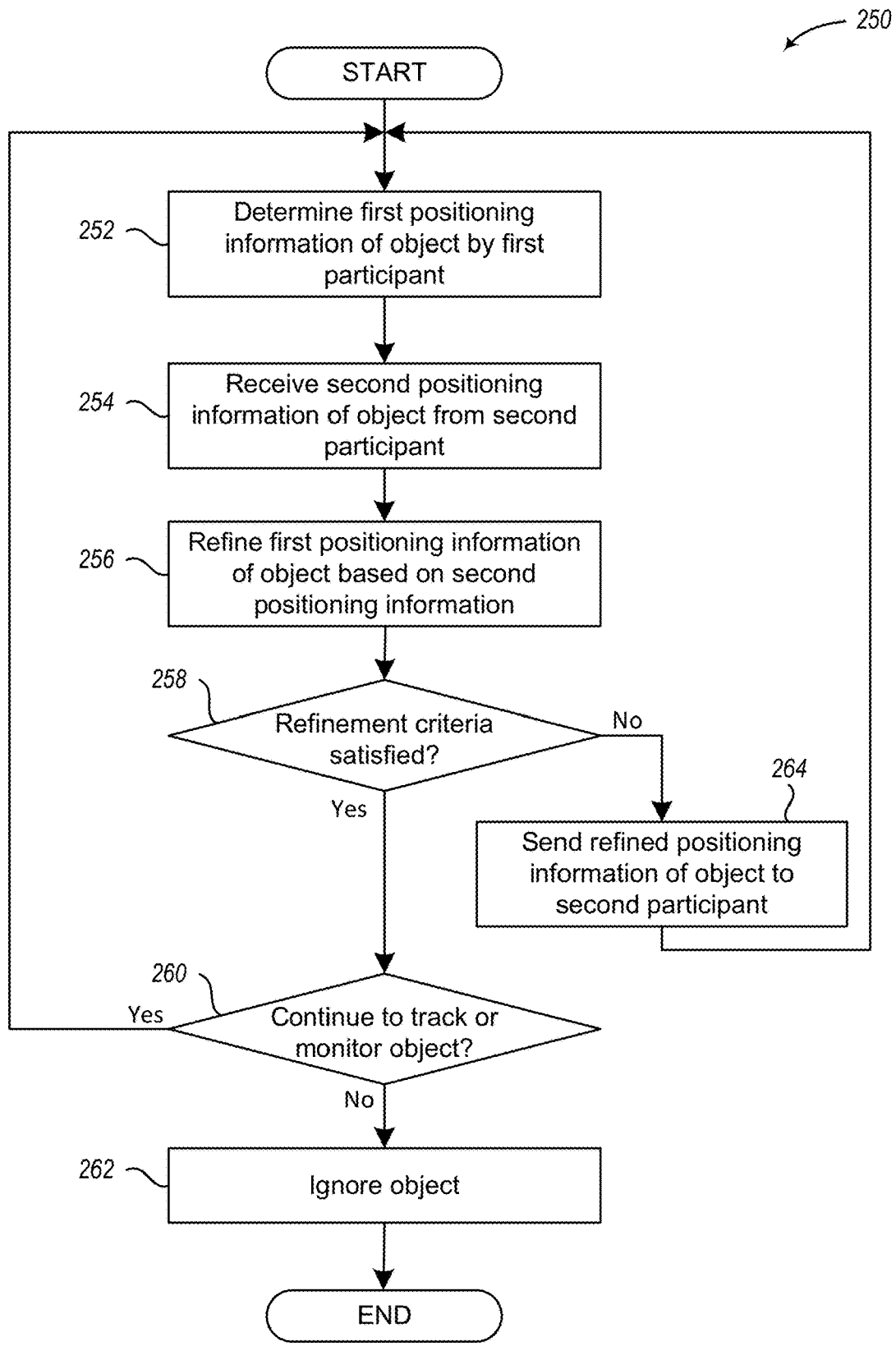
FIG. 6 illustrates a logical flow diagram showing one embodiment of a process for a computing system to refine object tracking in accordance with embodiments described herein.

FIG. 6 illustrates a logical flow diagram showing one embodiment of a process for a computing system to refine object tracking in accordance with embodiments described herein. Process 250 begins, after a start block, at block 252, where first positioning information of an object is determined by a first participant. In some embodiments, the first participant may transmit notification signals and receive echo signals off the object to determine the first positioning information of the object, as described herein. In other embodiments, the object may be another participant and the first positioning information may be included in a notification signal transmitted by the other participant and received by the first participant. In yet other embodiments, the first positioning information may be determined using reflection signals, as discussed above.

Process 250 proceeds to block 254, where second positioning information of the object is received from a second participant. In some embodiments, the second positioning information is provided in response to a request from the first participant for additional information regarding the object. In other embodiments, the second positioning information may be received in response to the second participant identifying the object and transmitting out the second positioning information to inform participants of the object. Although embodiments are described as receiving second positioning information for a single second participant, embodiments are not so limited and the first participant can receive second positioning information from a plurality of other participants.

Process 250 continues at block 256, where the first positioning information of the object is refined based on the second positioning information. In some embodiments, the participant can utilize the first and second positioning information to triangulate or perform additional fidelity calculations to refine the first positioning information. For example, the second participant can provide their position, a distance from the second participant to the object, and a heading or direction from the second participant to the object. This information can be used by the first participant in combination with a position of the first participant and heading or direction from the first participant to the object to determine a more accurate position of the object.

Process 250 proceeds next to decision block 258, where a determination is made whether one or more refinement criteria are satisfied. In some embodiments, the first participant may continue to refine the positioning information of the object until an accuracy threshold is achieved. For example, the first participant may continue to refine a geolocation of the object until the first participant has narrowed the object's geolocation to a position having an error of less than 10 meters.

In other embodiments, the refinement criteria may be satisfied if the object is out of range or out of line-of-sight of the first participant. In yet other embodiments, the refinement criteria may be satisfied if the object has been neutralized or otherwise no longer needs to be tracked.

In various embodiments, different refinement criteria can be utilized in different scenarios. For example, a first error threshold or accuracy may be utilized if the object is within a threshold distance from the first participants, but a second error threshold or accuracy may be utilized if the object is further away than the threshold distance. As another example, a first error threshold or accuracy may be utilized if the system or first participant has a data throughput less a threshold amount, but a second error threshold or accuracy may be utilized if the data throughput is more than the threshold amount.

If the refinement criteria is satisfied, process 250 flows to block 264; otherwise, process 250 flows to decision block 260.

At block 264, the refined positioning information of the object is transmitted to the second participant or other participants within line-of-sight of the first participant. In various embodiments, the first participant may include the refined positioning information with a next transmitted notification signal or as a separate data signal. In some embodiments, the first and second participants can communicate back and forth multiple times to further refine the positioning information of the object. Moreover, the participants can modify the size of the signals transmitted between the participants to accommodate for higher fidelity information, higher throughput, faster transmissions, etc.

After block 264, process 250 loops to block 252 to continue to determine and refine the positioning information of the object until the refinement criteria is satisfied.

If, at decision block 258, the refinement criteria is satisfied, process 250 flows from decision block 258 to decision block 260. At decision block 260, a determination is made whether to continue to track or monitor the object. In various embodiments, this determination is made based on the refinement criteria that is satisfied. For example, if the object is out of range of the first participant or the object has been neutralized, then the first participant does not need to continue to track the object. But if the object is still within line-of-sight of the first participant, then the first participant may continue to track the object even though the current positioning information of the object is at the accuracy threshold. If tracking of the object is to continue, process 250 loops to block 252; otherwise, process 250 flows to block 262 and ignores the object. After block 262, process 250 may terminate or otherwise return to a calling process to perform other actions.

Figure 7:
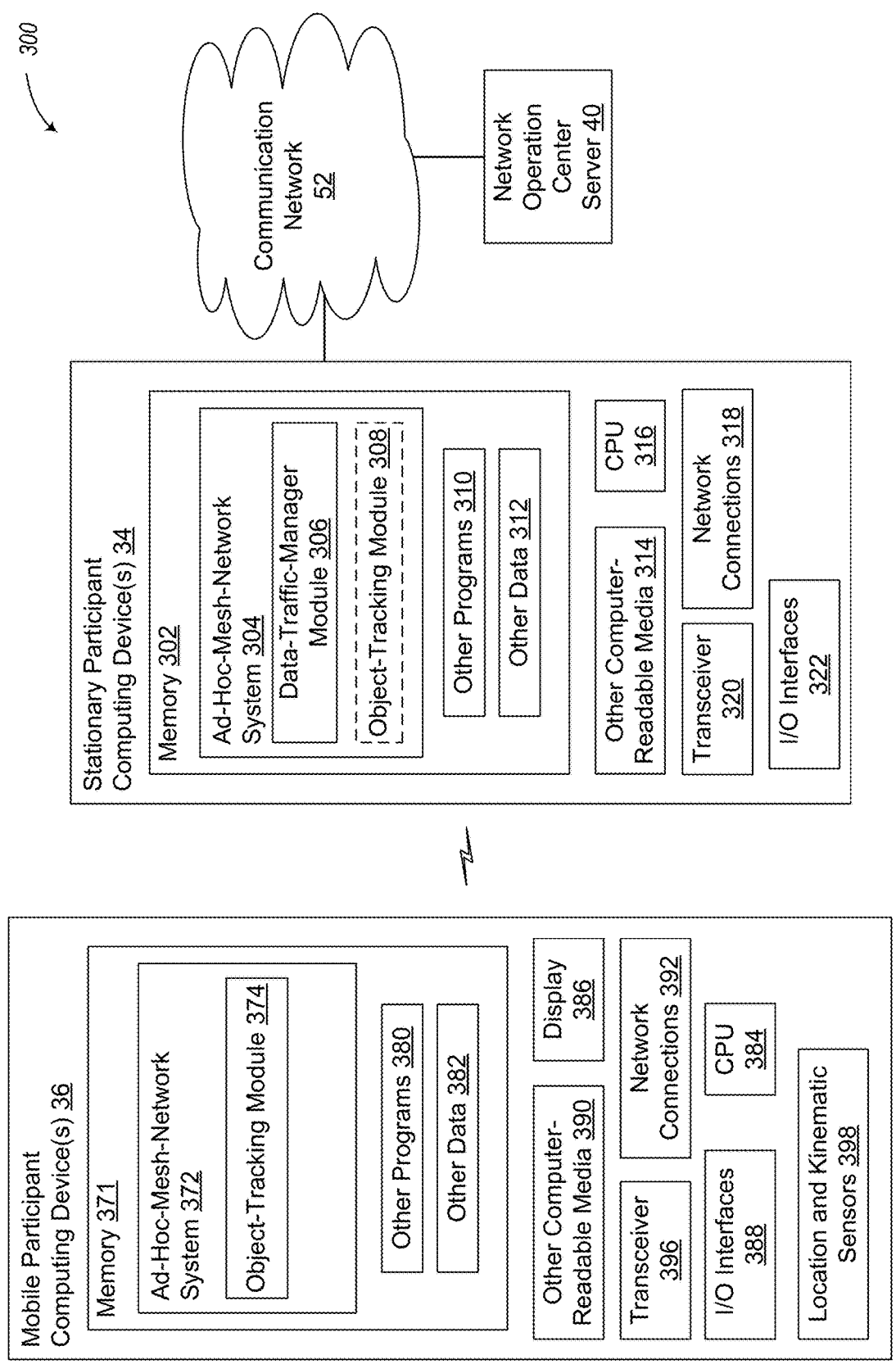
FIG. 7 shows a system diagram that describes one implementation of computing systems for implementing embodiments described herein.

FIG. 7 shows a system diagram that describes one implementation of computing systems for implementing embodiments described herein. System 300 includes mobile participant computing device(s) 36 (e.g., aerial mobile devices), stationary participant computing device(s) 34, and network operation center server 40.

Mobile participant computing device(s) 36 communicate with one or more other mobile participant computing devices 36 and stationary participant computing devices 34 via line-of-sight communications to transmit data and other communications among the participants. One or more special-purpose computing systems may be used to implement each mobile participant computing device 36. Accordingly, various embodiments described herein may be implemented in software, hardware, firmware, or in some combination thereof. A mobile participant computing device 36 may include memory 371, one or more central processing units (CPUs) 384, display 386, other I/O interfaces 388, other computer-readable media 390, network connections 392, transceiver 396, and location and kinematic sensors 398.

Memory 371 may include one or more various types of non-volatile and/or volatile storage technologies. Examples of memory 371 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 371 may be utilized to store information, including computer-readable instructions that are utilized by CPU 384 to perform actions, including embodiments described herein.

Memory 371 may have stored thereon ad-hoc-mesh-network system 372, which includes object-tracking module 374. The object-tracking module 374 may employ embodiments described herein to track objects, including other participants and non-participants. The memory 371 may also store other programs 380 and other data 382. The other programs 380 may include user applications, other tracking or geo-positioning programs, etc. The other data 382 may include participant and sensor information, data or information regarding one or more non-participant objects, or other information.

Network connections 392 are configured to communicate with other computing devices, such as other mobile participant computing devices 36 and stationary participant computing devices 34 via transceiver 396 and line-of-sight communications mechanisms and technologies. Transceiver 396 may be an omni-directional transceiver that sends and receives radio signals independent of direction, or transceiver 396 may be a directional transceiver that sends or receives, or both sends and receives, radio signals to or from a particular direction relative to the positioning of the mobile participant computing device 36.

Location and kinematic sensors 398 include one or more sensors that are used to determine the position of the mobile participant computing device 36 and the kinematic information of how the mobile participant computing device 36 is moving. Examples of location and kinematic data sensors 398 include, but are not limited to using participant's self-reported notifications calibrated off of stationary participants, processing the echo of participant's own self-reported notifications, GPS modules, accelerometers, gyroscopes, or other sensors that can be used to determine the position and kinematic information of the mobile participant computing device 36.

Other I/O interfaces 388 may include a keyboard, audio interfaces, video interfaces, or the like. Other computer-readable media 390 may include other types of stationary or removable computer-readable media, such as removable flash drives, external hard drives, or the like. Display 386 is a display interface that is configured to output images, content, or information to a user. Examples of display 386 include, but are not limited to, LCD screens, LEDs or other lights, or other types of display devices.

Stationary participant computing device(s) 34 communicate with mobile participant computing devices 36 via line-of-sight communications and with other stationary participants either by wired or wireless communications to transmit information or data to other participants or to non-participants. One or more special-purpose computing systems may be used to implement each stationary participant computing device 34.

Accordingly, various embodiments described herein may be implemented in software, hardware, firmware, or in some combination thereof. A stationary participant computing device 34 may include memory 302, one or more central processing units (CPUs) 316, I/O interfaces 322, other computer-readable media 314, network connections 318, and transceiver 320.

Memory 302 may include one or more various types of non-volatile and/or volatile storage technologies. Examples of memory 302 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 302 may be utilized to store information, including computer-readable instructions that are utilized by CPU 316 to perform actions, including embodiments described herein.

Memory 302 may have stored thereon ad-hoc-mesh-network system 304, which includes data-traffic-manager module 306 and optionally object-tracking module 308. The data-traffic-manager module 306 may employ embodiments described herein to transfer data from one participant to another participant. In some embodiments, the stationary participant computing device 34 may also include the object-tracking module 374, which may employ embodiments described herein to track objects. As described elsewhere herein, some stationary participant computing devices 34 may be used in conjunction with one or more mobile participant computing devices 32 to improve the accuracy of an object's position being tracked by at least one of the one or more mobile participant computing devices 32. The object-tracking module 308 may employ embodiments described herein to track objects, including other participants and non-participants, similar to object-tracking module 374. Although data-traffic-manager module 306 and object-tracking module 308 are shown as separate modules, embodiments are not so limited. Rather, a single module or a plurality of additional modules may be utilized to perform the functionality of data-traffic-manager module 306 and object-tracking module 308. In various embodiments, data-traffic-manager module 306 or object-tracking module 308, or both, may communicate with network operation center server 40 via communication network 52.

The memory 302 may also store other programs 310 and other data 312. The other data 312 may include participant data or information, data or information regarding one or more tracked objects, or other information.

Network connections 318 are configured to communicate with other computing devices, such as other stationary participant computing devices 34 and mobile participant computing devices 36 via transceiver 320 and wired or line-of-sight communications mechanisms and technologies. Network connections 318 are also configured to communicate with the network operation center server 40 via communication network 52.

Transceiver 320 may be a omni-directional transceiver that sends and receives radio signals independent of direction, or transceiver 320 may be a directional transceiver that sends or receives, or both sends and receives, radio signals to or from a particular direction relative to the position of the stationary participant computing device 34.

Other I/O interfaces 322 may include a keyboard, audio interfaces, video interfaces, or the like. Other computer-readable media 314 may include other types of stationary or removable computer-readable media, such as removable flash drives, external hard drives, or the like.

Network operation center server 40 includes one or more computing devices that store information about the positioning of mobile participant computing devices 36 and stationary participant computing devices 34, such as a master participant table. The network operation center server 40 may also store information regarding the sensor capabilities of each participant, as described herein. The network operation center server 40 also includes memory, one or more processors, network interfaces and connections, and other computing components similar to mobile participant computing devices 36 and stationary participant computing devices 34, but those components are not shown here for ease of illustration.

Communication network 52 may include one or more wired or wireless communication networks to transmit data between one stationary participant computing device 34 and another stationary participant computing device 34 or with the network operation center server 40.

The various embodiments described above can be combined to provide further embodiments. These and other changes can be made to the embodiments in light of the above-detailed description. Moreover, additional details and use case examples are provided in the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 15/892,259, filed Feb. 8, 2018, entitled "Object Tracking Using A Cognitive Heterogeneous Ad Hoc Mesh Network;" Provisional Patent Application No. 62/467,572, filed Mar. 6, 2017, entitled "Scatternet: A cognitive heterogeneous ad hoc mesh data/cellular/Wi-Fi network establishment/access points/connected devices through utilization of software applications exploiting existing technologies and frequency spectrum for data and voice communications through the exploitation of the Internet and Internet of Things, resulting in the creation of Data communications Adaptive RADAR (DATAR);" and U.S. patent application Ser. No. 15/913,612, filed Mar. 6, 2018, entitled "Cognitive Heterogeneous Ad Hoc Mesh Network;" which are incorporated herein by reference, in their entirety.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   determining, by a computing device of a first participant, a difference between a reported position of a second participant and characteristics of a signal received by the first participant containing the reported position;
   in response to the difference being below a first threshold, transmitting, by the computing device of the first participant, the reported position of the second participant to a third participant; and
   in response to the difference being above the first threshold, transmitting, by the computing device of the first participant, a refined position for the second participant to the third participant.

2. The method of claim 1, further comprising:
   in response to the difference being above a second threshold that is higher than the first threshold, transmitting, by the computing device of the first participant, the reported position of the second participant to the third participant.

3. The method of claim 1, further comprising:
   in response to the difference being above a second threshold that is higher than the first threshold, determining, by a computing device of a first participant, that the signal containing the reported position is a reflection signal and the second participant is out of line-of-sight of the first participant.

4. The method of claim 1, wherein transmitting, by the computing device of the first participant, the refined position for the second participant to the third participant is in response to the difference being above the first threshold and below a second threshold.

5. The method of claim 1, further comprising:
   receiving, by the computing device of the first participant, positioning information of the second participant from the third participant; and
   generating, by a computing device of a first participant, the refined position from a comparison between the reported position and the positioning information.

6. The method of claim 1, further comprising:
   receiving, by the computing device of the first participant, a communication signal that includes the reported position of the second participant.

7. The method of claim 1, further comprising:
   modifying, by a computing device of a first participant, the refined position in response to the refined position failing to satisfy at least one refinement criteria.

8. A computing device of a first participant, comprising a memory that stores computer instructions; and a processor that, when executing the computer instructions, causes the computing device to:
   determine a comparison between a transmitted position of a second participant and characteristics of a signal received by the first participant containing the transmitted position;
   transmit the reported position of the second participant to a third participant in response to the comparison being below a first threshold; and
   transmit a refined position for the second participant to the third participant in response to the comparison being above the first threshold.

9. The computing device of claim 8, wherein the processor, when executing the computer instructions, further causes the computing device to:
   transmit the reported position of the second participant to the third participant in response to the comparison being above a second threshold that is higher than the first threshold.

10. The computing device of claim 8, wherein the processor, when executing the computer instructions, further causes the computing device to:
    determine that the signal containing the reported position is a reflection signal in response to the comparison being above a second threshold that is higher than the first threshold.

11. The computing device of claim 8, wherein the processor, when executing the computer instructions, further causes the computing device to:
    determine that the second participant is out of line-of-sight of the first participant in response to the comparison being above a second threshold that is higher than the first threshold.

12. The computing device of claim 8, wherein transmitting the refined position for the second participant to the third participant is in response to the comparison being above the first threshold and below a second threshold . . .

13. The computing device of claim 8, wherein the processor, when executing the computer instructions, further causes the computing device to:
    receive positioning information of the second participant from the third participant; and
    generate the refined position based on the reported position and the positioning information.

14. The computing device of claim 8, wherein the processor, when executing the computer instructions, further causes the computing device to:
    receive a communication signal that includes the reported position of the second participant.

15. The computing device of claim 8, wherein the processor, when executing the computer instructions, further causes the computing device to:
    modify the refined position in response to the refined position failing to satisfy at least one refinement criteria.

16. A non-transitory computer-readable storage medium that stores instructions that, when executed by a processor in a computing system of a first participant, cause the processor to perform actions, the actions comprising:
    determining a positional difference between reported positional information of a second participant and positional characteristics of a signal received by the first participant containing the reported positional information;
    in response to the positional difference being below a first threshold, transmitting the reported positional information of the second participant to a third participant; and in response to the positional difference being above the first threshold, transmitting refined positional information for the second participant to the third participant.

17. The non-transitory computer-readable storage medium of claim 16, wherein execution of the instructions by the processor cause the processor to perform further actions, the further actions comprising:
in response to the positional difference being above a second threshold that is higher than the first threshold, transmitting the reported positional information of the second participant to the third participant.

18. The non-transitory computer-readable storage medium of claim 16, wherein execution of the instructions by the processor cause the processor to perform further actions, the further actions comprising:
in response to the positional difference being above a second threshold that is higher than the first threshold, determining that the signal containing the reported positional information is a reflection signal and the second participant is out of line-of-sight of the first participant.

19. The non-transitory computer-readable storage medium of claim 16, wherein transmitting the refined positional information for the second participant to the third participant is in response to the positional difference being above the first threshold and below a second threshold . . .

20. The non-transitory computer-readable storage medium of claim 16, wherein execution of the instructions by the processor cause the processor to perform further actions, the further actions comprising:
receiving additional positioning information of the second participant from the third participant; and
generating the refined positional information from a comparison between the reported positional information and the additional positioning information.

* * * * *